April 10, 1956 H. E. WITTMAN 2,741,050
CORSAGE HOLDER
Filed July 15, 1954

INVENTOR.
H.E. Wittman
BY
ATTORNEY

United States Patent Office 2,741,050
Patented Apr. 10, 1956

2,741,050

CORSAGE HOLDER

Herbert E. Wittman, Henryetta, Okla.

Application July 15, 1954, Serial No. 443,634

3 Claims. (Cl. 41—12)

This invention relates to decorative corsage frames and more particularly, but not by way of limitation, to pre-formed corsage frames to enable an inexperienced person to easily construct an attractive corsage.

Present day corsage frames have certain disadvantages in that their construction permits the flower holding portions to twist and become distorted due to the activities of the wearer, such as in dancing and the like. The flowers secured to the frame frequently become loose and drop off, and the present invention contemplates a corsage frame designed to resist any turning or twisting motion and to hold flowers securely thereon, thus assuring an attractive long lasting corsage. In a recently issued patent to M. Stegena, No. 2,583,237, dated January 22, 1952, a pre-formed corsage frame is disclosed, but the flower holding elements are not precluded from twisting and turning, all of which is detrimental to an efficient flower holding corsage.

It is an important object of this invention to provide an attractive pre-formed corsage frame capable of resisting turning or distortions thereof due to activities of the wearer.

It is another object of this invention to provide a corsage frame designed to hold flowers thereon in a secure manner to substantially preclude any accidental loss of the flowers from the corsage during use.

It is a further object of this invention to provide a pre-formed corsage frame that is simple to use to enable an inexperienced person to assemble an attractive corsage.

It is a still further object of this invention to provide a corsage frame which may be used and re-used many times without detriment or any substantial wear on the frame.

It is another object of this invention to provide a corsage frame which may be quickly and easily assembled, and which is durable and economical in construction.

Other objects and advantages of the invention will be evident from the following detailed description, read in conjunction with the accompanying drawings, which illustrate my invention.

Figure 1:
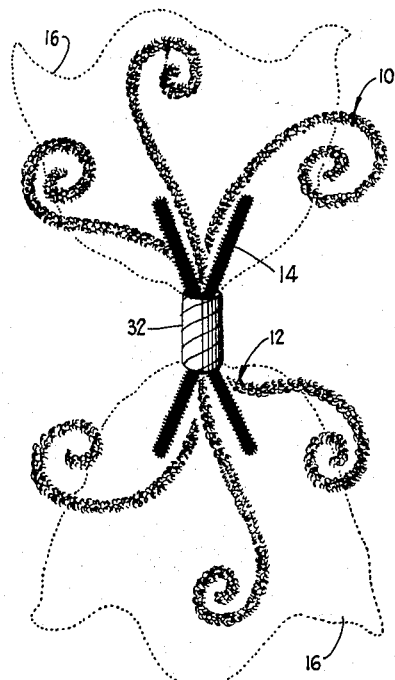
Figure 1 is a plan view of an assembled corsage frame emboding the invention with certain portions shown in dotted lines for clarity.

Referring to the drawings in detail, reference character 10 represents in general an assembled corsage frame comprising a body portion 12, a flower holding portion 14, and a suitable net dress 16 or the like utilized to enhance the beauty of the corsage frame 10.

Figure 2:
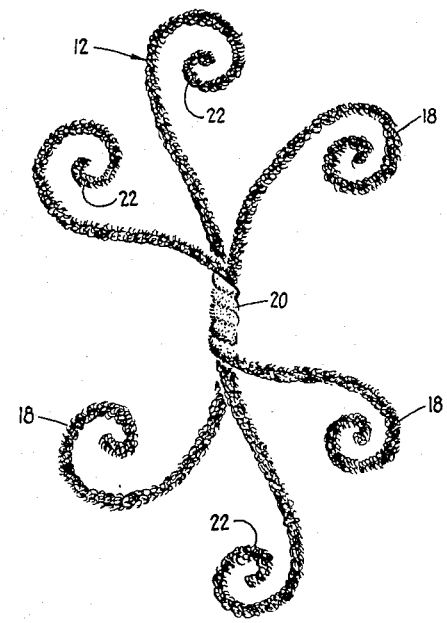
Figure 2 is a plan view of the body of the novel corsage frame.

The body portion 12 (Fig. 2) comprises a plurality (usually three) of wires 18, preferably made of chenille covered flexible wire, but not limited thereto, which are intertwined or twisted together as clearly shown at 20 in Fig. 2. This intertwining securely holds the wires 18 in a substantially flat plane and precludes any turning or twisting from the plane formed thereby. The ends 22 may be spirally wound in any suitable manner to provide helical scrolls in order to add to the attractive aspect of the corsage frame 10.

Figure 4:
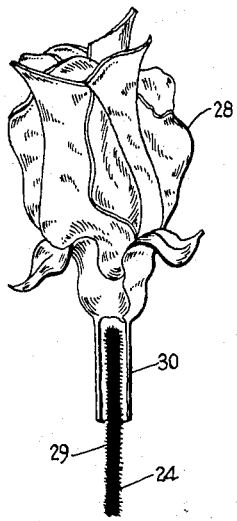
Figure 4 is a perspective view of a flower or the like secured to a flower holding portion of the novel corsage frame with certain portions cut away for clarification.
Figure 3:
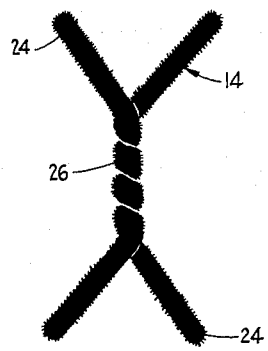
Figure 3 is a plan view of the flower holding portion of the novel corsage frame.

The flower holding element 12 (Fig. 3) comprises a plurality of flexible wires 24 intertwined in a similar manner as hereinbefore described and clearly shown at 26 (Fig. 3). The wires 24 are preferably made of flock coated wire, and the flock coating may be any suitable fibrous material comprising minute bristle like hairs usually present in flock coatings. Although only two wires 24 are shown, it will be apparent that any desired number of the wires 24 may be used as are found necessary to accommodate the quantity of flowers to be secured on the frame 10. The wires 24 are of sufficient length to accommodate any species of flower, and the wires may be shortened by clipping or the like, after the corsage frame is assembled. The flock coating on the wires 24 is of material assistance in securely holding a flower 28 in that the coarse bristle-like hair 29 of the flocking is forced to extend in a radially outward and angled direction. As the wire 24 is forced into the stem 30 of the flower 28 (Fig. 4), the angled flocking tends to resist any upward action of the stem 30, and considerable pressure must be applied to remove the flower 28 from the wire 24.

When it is desired to assemble a corsage of large hollow stemmed flowers (not shown) such as chrysanthemums, iris and the like, the ends of two of the wires 24 may be moved in juxtaposition without distortion of the plane of the frame 10, and the ends of the two wires may then be inserted in the hollow stem of the flower. If the two wires are brought together without additional twisting, they will maintain a tendency for the V-configuration, thereby effecting an outward tension against the inner portion of the flower stem, thus affording a more effective holding of the flowers.

In assembly, the body 12 and the flower holding portion 14 are disposed adjacent each other so that the twisted portions 20 and 26 are in proper alignment as shown in Fig. 1, and are secured firmly together by any suitable means, such as a wire (not shown) wound around the twisted portions 20 and 26. The net dress 16 may then be secured to the frame by any suitable florists' tape 32 (Fig. 1). The flocked wires 24, being flexible, may be bent in a direction away from the body 12 as desired to receive the flowers 28 as hereinbefore described. Thus an attractive, durable corsage is assembled.

When the flowers 28 have wilted or otherwise damaged, it is possible to remove them from the frame by grasping each flower in any well known manner and exerting a sufficient amount of pressure to overcome the holding force of the flocked wire 24. It will then be apparent that the corsage frame may be used repeatedly as fresh flowers are substituted for the old.

From the foregoing, it will be apparent that the present invention contemplates a pre-formed corsage frame wherein all the elements are securely maintained in a center body portion in such a manner to preclude any unraveling or disassembly of the frame by twisting, turning or the like. Furthermore, it will be apparent that the flower holding wires of the corsage frame are provided with bristle like elements assisting the securing of the individual flowers disposed thereon so that they will not easily come loose by unusual use of the flower by the wearer.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a corsage holder comprising a frame member including a plurality of wires twisted together to provide a body portion of several convolutions, each of said wires having a spirally wound end scroll, a plurality of flower holding wires twisted together to provide a central body portion of multiple convolutions having straight wire portions extending outwardly at various angles from the central body portion for receiving flower stems thereon, said body portion of the intertwined holding wires disposed adjacent the body portion of the spiral scroll frame member, and means for securing the holding wires and the frame together, said flower holding wires having flock coating thereon providing bristle like minute hairs extending in an angled direction therefrom for resisting any retrograde movement of a flower stem disposed thereon.

2. In a pre-formed corsage holder comprising a frame member having a plurality of wires twisted together to provide a body portion of several convolutions, each of said wires extending from the body portion and having a helically wound end scroll portion, a plurality of holding wires twisted together to provide a central body portion of multiple convolutions having straight wire portions extending outwardly at various angles from the central body portion for receiving flower stems thereon, said body portion of the holding wires disposed adjacent the body portion of the frame member, and means for securing the holding wires and the frame member together, said flower holding wires having flock coating thereon providing minute hairs extending at an angle complementary to the direction of the placement of the flower stem whereby retrograde movement of the flower stem disposed thereon is resisted.

3. In a pre-formed corsage holder comprising a frame member, a plurality of flower holding wires twisted together and secured to the frame member, said holding wires extending outwardly for receiving flower stems thereon, said holding wires including a flock coating thereon having minute bristles extending at any angle therefrom for resisting any loosening of the flower stems disposed thereon.

References Cited in the file of this patent

UNITED STATES PATENTS

| | | |
|---|---|---|
| 1,992,873 | Mayer et al. | Feb. 26, 1935 |
| 2,583,237 | Stegena | Jan. 22, 1952 |